(12) United States Patent
Alibakhsh et al.

(10) Patent No.: US 9,514,410 B2
(45) Date of Patent: Dec. 6, 2016

(54) SYSTEM AND METHOD FOR IDENTIFYING AND CONDENSING SIMILAR AND/OR ANALOGOUS INFORMATION REQUESTS AND/OR RESPONSES

(71) Applicant: Nuesoft Technologies, Inc., Marietta, GA (US)

(72) Inventors: Massoud Alibakhsh, Atlanta, GA (US); Shahram Famorzadeh, Marietta, GA (US)

(*) Notice: Subject to any disclaimer, the term of this patent is extended or adjusted under 35 U.S.C. 154(b) by 329 days.

(21) Appl. No.: 13/874,244

(22) Filed: Apr. 30, 2013

(65) Prior Publication Data

US 2014/0324754 A1    Oct. 30, 2014

(51) Int. Cl.
*G06N 5/02* (2006.01)

(52) U.S. Cl.
CPC ..................... *G06N 5/025* (2013.01)

(58) Field of Classification Search
None
See application file for complete search history.

(56) References Cited

U.S. PATENT DOCUMENTS

| | | | |
|---|---|---|---|
| 5,943,667 A | 8/1999 | Aggarwal | |
| 6,314,415 B1 * | 11/2001 | Mukherjee | 706/47 |
| 7,337,230 B2 | 2/2008 | Zehavi | |
| 7,617,116 B2 | 11/2009 | Amar | |
| 7,630,911 B2 | 12/2009 | Kay | |
| 7,720,701 B2 | 5/2010 | Richards | |
| 7,925,605 B1 * | 4/2011 | Rubin | 706/47 |
| 7,970,629 B2 | 6/2011 | Christen | |
| 8,355,930 B2 | 1/2013 | Tholl | |
| 8,401,986 B1 * | 3/2013 | Franke | 706/47 |
| 2004/0059639 A1 | 3/2004 | Ripper | |
| 2004/0098284 A1 | 5/2004 | Petito | |
| 2006/0100905 A1 | 5/2006 | Christen | |
| 2007/0055552 A1 | 3/2007 | St. Clair | |
| 2012/0116813 A1 | 5/2012 | Schoenberg | |

(Continued)

OTHER PUBLICATIONS

Popescu et al, Extracting Product Features and Opinions from Reviews, 2007.*

*Primary Examiner* — Stanley K Hill
*Assistant Examiner* — Mikaya Chubb
(74) *Attorney, Agent, or Firm* — Mathew L. Grell; Grell & Watson Patent Attorneys

(57) ABSTRACT

A system and method for identifying and condensing similar and/or analogous information requests and/or responses comprising a computer apparatus having an intelligent global rules engine to facilitate interaction with information requests and/or responses. The computer apparatus comprises machine-readable medium, wherein data is stored, wherein the data comprises a comparison of similar and/or analogous information requests and/or responses, wherein redundancies and/or analogies in information requests and/or responses have been identified and condensed to remove the redundancies and/or analogies thereby creating at least one global rule, rule group and/or single rule. The computer apparatus further comprises both a data processing module, wherein the data processing module comprises a lexical analyzer with contextual awareness, and an intelligent global rules engine, wherein the intelligent global rules engine comprises the at least one global rule, rule group and/or single rules.

9 Claims, 10 Drawing Sheets

(56) References Cited

U.S. PATENT DOCUMENTS

2012/0158628 A1\* 6/2012 Junker ............................ 706/14
2013/0085977 A1\* 4/2013 Junker ............................ 706/47
2014/0180970 A1\* 6/2014 Hettenkofer et al. .......... 706/11

\* cited by examiner

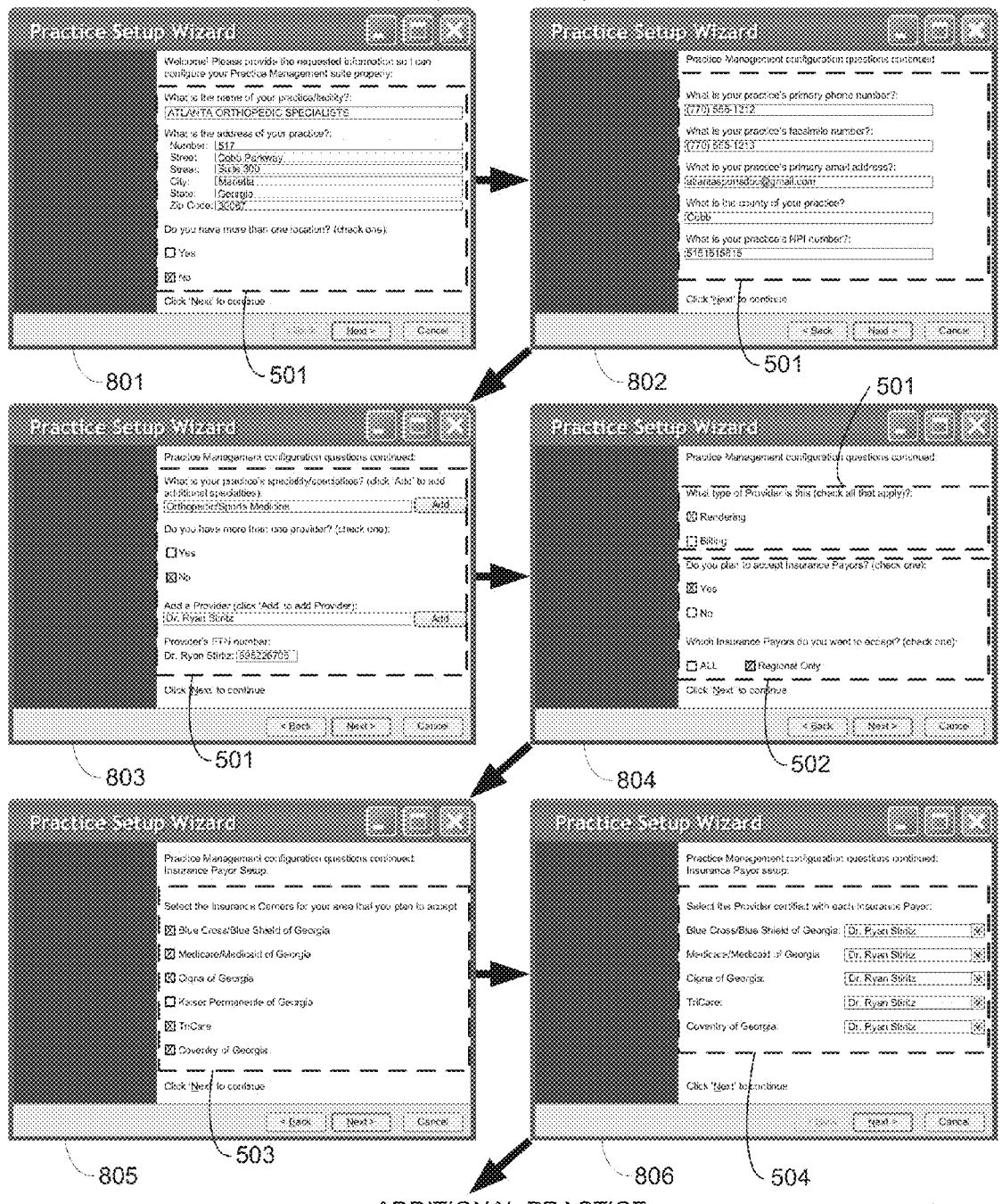

SYSTEM AND METHOD FOR IDENTIFYING AND CONDENSING SIMILAR AND/OR ANALOGOUS INFORMATION REQUESTS AND/OR RESPONSES

CROSS-REFERENCE TO RELATED APPLICATIONS

None

FEDERALLY SPONSORED RESEARCH OR DEVELOPMENT

None

PARTIES TO A JOINT RESEARCH AGREEMENT

None

REFERENCE TO A SEQUENCE LISTING

None

BACKGROUND OF THE INVENTION

1. Technical Field of the Invention

The present invention relates generally to database and file management or data structures. Specifically, it provides a system and method for creating global rules that reduce data redundancy and computational latency by consolidating duplicated payor rules.

2. Description of Related Art

Medical practices treat thousands of patients, insured by various healthcare organizations. As a result, a critical daily component of the Practitioner's organization involves the successful processing and filing of medical claims to a multitude of payors. While there is considerable commonality in claim information between payors, each payor can have differing rules regarding the claim format and content, further increasing the complexity of the processing and filing.

Practice Management Software (PM) is the most common way medical providers submit insurance claims. Many PMs have claim scrubbing features that review claims for inaccuracies prior to submission. However, despite scrubbing efforts to increase successful processing, human error is unavoidable. A common reason for errors is differences between submission requirements among payors. Although some submission requirements apply to all payor organizations (i.e. universal rules), currently used PMs also separately collect and store unique payor rules needed for claim submission compliance. To ensure compliance with all the rules, universal or unique, Practitioners must manually apply the rules for each payor organization—directly reducing available time and resources for seeing patients and earning revenue.

Storing, maintaining, and processing numerous redundant payor rules makes PM software setup very resource intensive. Large amounts of network resources are spent storing and processing superfluous payor rules, thereby causing data clutter. The PM software setup process is further affected due to unnecessary setup protocols that force medical practices to communicate with setup systems. The added inefficiency of data clutter and additional setup protocols cause implementation errors and resource drain, further reducing medical organizations' ability to realize improved data interoperability via collaboration.

The St. Claire, et al. patent application; having U.S. patent application Ser. No. 11/493,922; filed Jul. 27, 2006; and entitled, "System and Method for Health Care Data Integration and Management"; discloses one attempt to eliminate redundant data by focusing on combining duplicate data allocated among distinct medical organizations. The method comprises gathering all data from participating organizations and compiling the data into a conglomerate group. This allows any overlapping data to be identified and permanently eliminated. Then, once the redundant data is removed, the remaining data is re-categorized and disseminated for utilization. However, despite this system and method's efficacy in data reduction among shared communications, the underlying latency issues from resource drain remain unresolved. Eliminating partial data does not address core issues in computational latency. Re-categorizing existing data may reduce clutter, but it has no bearing on expediting automated form completion.

The Kay patent; having U.S. Pat. No. 7,630,911; filed Oct. 23, 2002; and entitled, "Method of Automated Processing of Medical Data for Insurance and Disability Determinations"; discloses another method for the elimination of redundant data during preliminary health insurance vetting methods. The method suggests patients seeking special medical coverage must complete medical claims that declare patients' ailments and/or symptoms. This often results in multiple claims per patient being filed—each claim represents a respective ailment. Medical practitioners must administer specific protocols for each claim, often causing an overlap in the implementation of services. In order to reduce the overlap, the method involves creation of primary databases that encompass explanations for all claim types. An auxiliary database acts as a liaison between the primary database and medical practitioners, providing Practitioners with detailed explanations for non-overlapping administration of services in response to multiple claims. This system does reduce the administration of overlapping medical services, but it perpetuates redundant data computation and introduces additional latency issues inherent in the maintenance of multiple synchronized databases.

The Christen patent; having U.S. Pat. No. 7,970,629; filed Oct. 19, 2007; and entitled, "Adaptive System for Financial Claim Reimbursement Processing"; discloses yet another system attempt to expedite medical claim submissions by reorganizing payor rules to accommodate medical practices' claim submission workflow. In short, medical claims are invoices addressed to insurance payors for compensation for administered medical services and/or goods. Often, distinct payors require unique claim submission compliance, thereby requiring storing and maintaining myriads of data. To alleviate the strain of maintaining copious amounts of data, the system reorganizes the stored rules according to importance and frequency of use with certain claim types. This system addresses the redundant data computation and additional latency issues the prior system discussed, but it does not optimize potential benefits. Simply reallocating payor rules among different data tables produces minimal results because the system still must cipher through myriads of data regardless of relocation.

The Petito at al. patent application; having U.S. patent application Ser. No. 10/664,486; filed Sep. 17, 2003; and entitled, "Automated Work-Flow Management System with Dynamic Interface"; discloses a further system that focuses on eliminating the inputting of redundant data during the automated creation of electronic forms, which are used to communicate among parties despite geographical separation. In this system, users are issued electronic cards (ecards) that are displayed on the input interface and communicate with databases that store algorithms/rules. Ecards provide the system with the data needed for the creation of forms and upon receipt and the algorithms are used to populate the forms. This invention reduces data redundancy; however, it does not reduce the pervasive latency issues caused by excessive data storage. Even though this system does not call for the redundant data to be appended onto the forms, it still requires valuable system resources to be spent housing, processing and managing superfluous data.

The Amar et al. patent; having U.S. Pat. No. 7,617,116; filed Aug. 3, 2001; and entitled, "Practice Management and Billing Automation System"; discloses an additional system that attempts to address problems with PM setup and claim submission protocols. This system's PM setup process includes a setup server that communicates with medical practices and relevant payors. The setup server requests initial setup information such as address, physicians' names, and accepted insurance payors from medical practices. Next, the setup server uses the data provided to begin the PM setup, including retrieving payor rules needed for claim submissions. Insurance payors often require compliance with relative standards during claim submission, thereby requiring subsequent data from medical practices to satisfy compliance. Ideally, the system's setup process would only require a maximum of two data requests; however, unforeseen rules collection issues may easily require additional requests. The likelihood for additional required requests introduces inefficiency into the PM setup process due to excessive communications between parties. Also, this invention's claim submission process lacks efficiency due to inadequate housing and implementation of insurance payor rules. The system creates multiple database tables and each table is utilized specifically to store all rules relating to one payor. Again, even though many rules are commonly shared among payors, the system teaches database storage of duplicate rules, thereby fostering redundancy and computational latency. The system attempts to mitigate this latency by recognizing and partially eliminating redundant rules within individual payor tables that have similar end results. Few redundant rules are actually eliminated though, leaving behind redundant rules related to each payor.

In light of the current state of the art, it is readily apparent that a comprehensive solution to inefficient data processing is needed. Reorganizing, renaming and/or relocating redundant data may provide temporary solutions to part of the problem; however such processes do not optimize database resources that facilitate efficient claim submissions. Thus, there is a need for a system and method of effectively analyzing payor rules to consolidate duplicate rules into new "global" rules, which remove the superfluous data from the database and reduce computational latency.

BRIEF SUMMARY OF THE INVENTION

The present system and method can be used in health care management data processing systems. Specifically, it can be used in the electronic dissemination of patient records and the writing of insurance policies or the processing of insurance claims. Further uses include the delivery, organization, and computerized arrangement for transfer of critical legal documents.

The invention reduces computational latency caused by storing, maintaining, and administering duplicated data. This latency is most evident in PMs' processing of insurance claims. In order to process claims, PMs require insurance payor rules. Although each payor has proprietary rules, many rules overlap. Without a way to recognize the overlapping rules, the duplicate rules cannot be removed, forcing the PM to cull through duplicate records in the database.

Broadly described, the present invention comprises a Global Rules Engine (GRE) that facilitates latency reduction by analyzing and consolidating redundant rules into Global Rules. In this capacity, the GRE plays a key role in PM setup by electronically collecting practice information needed for PM setup. Previous methods required the same practice information in paper form submission. Due to the vast differences among practices, the accurate and efficient collection of practice data is a critical step. For example, specialized practices often only accept a small subset of insurance payors, while general practices usually accept a much larger number of insurance payors. Hence, the differences among practices directly correlate to distinct PM needs.

Payor-specific rules are unique rules that apply to an individual insurance payor. In order to satisfy claim submission compliance with all of the insurance payors, practices must collect, maintain, and implement myriads of rules per payor. Rather than requiring practices manually gather all mandatory rules, the invention automatically and electronically collects payor data. The system then uses this data to facilitate claim submissions by eliminating redundant rules among payors, automatically reducing computational latency and data clutter. Although the GRE's functionality has no direct bearing on the payor-specific rules themselves, the invention's GRE introduces huge efficiencies in the PMs' ability to retrieve these rules from the database once duplicates have been removed. The efficiencies are also recognized with rules that only apply to two or more payors, but not all. Those rules are also consolidated into Global Rules and applied only to the corresponding payors.

One preferred embodiment uses the GRE to improve claim submissions. The GRE contacts a plurality of insurance payors to collect rules necessary for submission compliance. Upon collecting the rules, the GRE jointly analyzes all rules regardless of payor to identify and eliminate any redundancies. It does this by consolidating duplicate rules into Global Rules, where the duplicate rules comprise the same rule stored in at least two distinct payor data tables. The disclosed system is capable of recognizing all redundant rules despite small differences in syntax. After creating the Global Rules, the system establishes communication with the designated medical practice for the further collection of general information (e.g. physician names and accepted insurance payors). The system then determines which payor/global rules apply and sends them to the corresponding databases. Thus, when processing multiple claims from various payors, the system no longer retrieves identical rules multiple times from different payor data tables.

One example of the invention's utility is apparent when dealing with National Provider Identifier (NPI) numbers used for insurance payor identification. Most insurance payors require mandatory disclosure of NPI numbers in filed claims. Rather than repetitively collecting and storing the same NPI rule from each payor, the invention creates a Global Rule that is applied to all relevant payors, thereby storing the rule only once and reducing superfluous data in the database.

Another embodiment teaches improvements to the PM setup process. Previous systems require extensive communication between setup systems and medical practices. The systems first contact medical practices to collect general information, including accepted insurance payors. Next, the system retrieves payor rules. It is during this retrieval process where the payor rules often disclose additional requirements not satisfied by the initial collection of practice data. The disclosed system precludes subsequent requests by collecting payor rules first, enabling the system to analyze rule nuances. The system creates one primary data request that encompasses all compliance demands, thereby ensuring fulfillment of submission terms. Thus, practices would no longer be faced with frequent data requests that could increase data errors and jeopardize compliance.

One benefit of the invention includes effortless PM setup facilitated by the GRE. Other methods require practices to submit paper forms for setup, which often prolongs setup completion. Still other electronic setup systems require superfluous communication between parties. The present invention enables electronic PM setup, drastically reducing required party communication.

Yet another benefit of the invention includes automated completion of claim forms. Most medical professional providers prefer to submit claims directly to payors electronically. As mentioned, the GRE provides for a quick and easy practice setup process. Because the practice management information is all collected at setup, the system is able to populate claim forms with this information and the information collected via the Global Rules. This allows practitioners to only input claim data once, thereby streamlining the submission processes. By using Global Rules to streamline this process, database resources are more efficiently utilized.

The primary goal of the invention is to remove latency during claim submissions by correcting computational, storage and network inefficiencies. The secondary goal is to improve PM setup by obviating paper form submissions and reducing party communications. The tertiary goal is to reduce claim errors and subsequent claim rejections by automating the claim submission process.

To those skilled in the art, alternate embodiments are appropriate anywhere improvements in efficiencies and accuracy can be achieved by identifying duplicate information and condensing entries—thereby reducing not only setup times, but information processing and overhead, data search latency, document production, etc. For example, other industries where insurance is utilized can easily benefit from the present disclosure. Additionally tax preparation and finance often suffer from excessive amounts of duplicate information, processing and overhead. Technical support in many industries often following common linear troubleshooting processes, and thus are highly sensitive to inefficiencies in data redundancy and latency. Another possible embodiment is contract administration for any industry, whereby contracts are populated from alternate data sources and the populated entries can become stored data for later maintenance, reducing the requirement to re-enter, or otherwise hand-code free text fields. Ultimately, the efficiencies and accuracy the present disclosure seeks to achieve are useful in many industries and applications besides health care practice management.

These and other features of the present disclosure will become more apparent to one skilled in the art from the following Summary, Brief Description of the Drawings, Detailed Description, and Claims when read in light of the accompanying Detailed Drawings.

BRIEF DESCRIPTION OF THE SEVERAL VIEWS OF THE DRAWINGS

The present invention will be better understood by reading the Detailed Description of the Preferred and Selected Alternate Embodiments with reference to the accompanying drawing figures, which are not necessarily drawn to scale, and in which like reference numerals denote similar structure and refer to like elements throughout, and in which:

FIG. 7A is a series of screen shot views of an exemplary computer apparatus practice management setup interface depicting an exemplary practice setup process information gathering flow (from the front-end) with a global rules engine included, according to the embodiment of FIGS. 1-3, and FIG. 5A;

Figure 1:
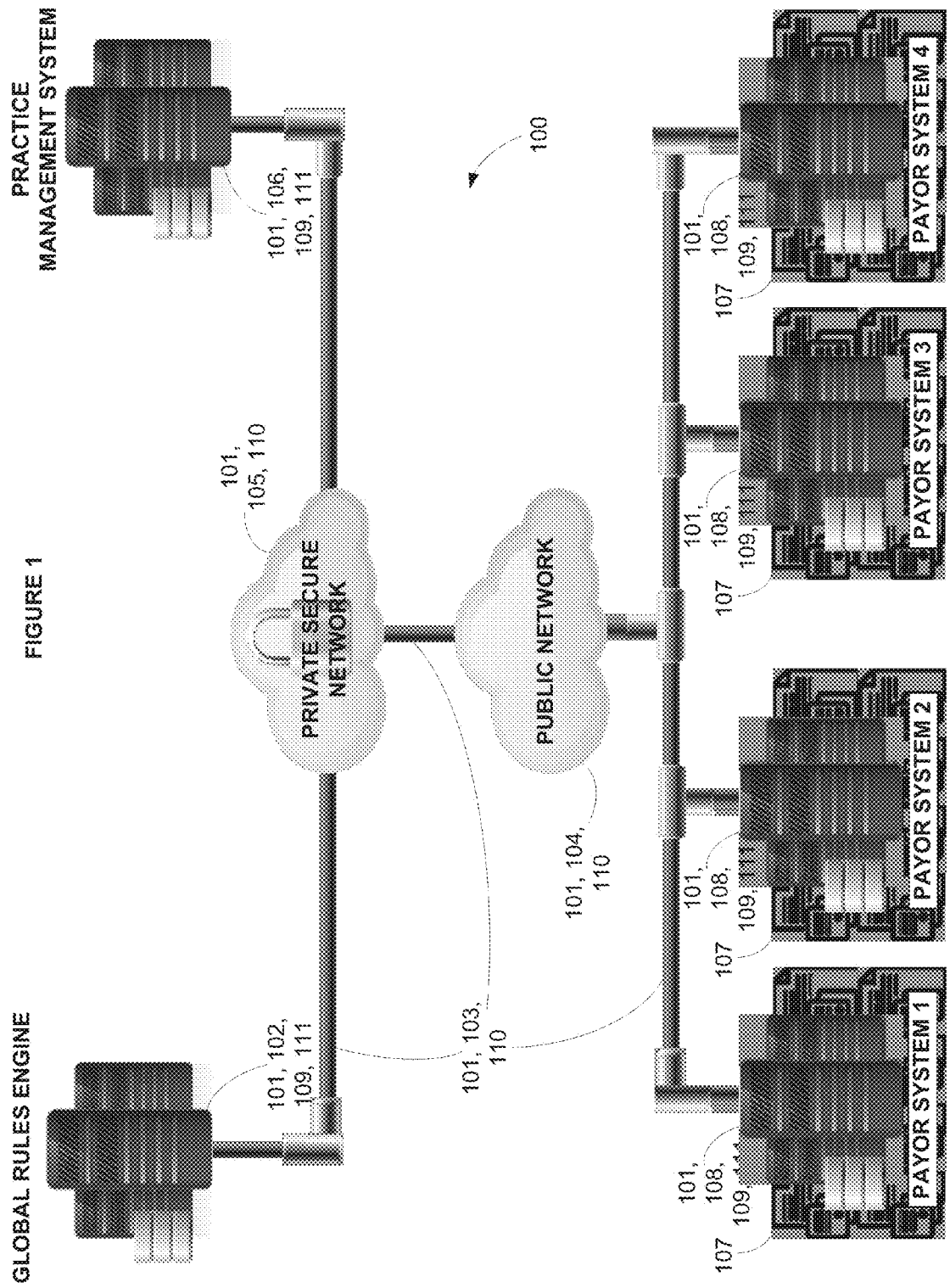
FIG. 1 is a schematic overview according to a preferred embodiment of a secure network depicting use of at least one global rules engine that identifies and condenses similar entries.

It is to be noted that the drawings presented are intended solely for the purpose of illustration and that they are, therefore, neither desired nor intended to limit the disclosure to any or all of the exact details of the construction shown, except insofar as they may be deemed essential to the claimed disclosure.

DETAILED DESCRIPTION OF THE PREFERRED AND SELECTED ALTERNATE EMBODIMENTS OF THE INVENTION

In describing the preferred and selected alternate exemplary embodiments of the present disclosure, as illustrated in FIGS. 1-7B, specific terminology is employed for the sake of clarity. The present disclosure, however, is not intended to be limited to the specific terminology so selected, and it is to be understood that each specific element includes all technical equivalents that operate in a similar manner to accomplish similar functions. Embodiments of the claims may, however, be embodied in many different forms and should not be construed to be limited to the embodiments set forth herein. The examples set forth herein are non-limiting examples, and are merely examples among other possible examples.

Referring now to FIGS. 1-7B, by way of example and not limitation, there is illustrated an example embodiment of session 100 for identifying and condensing similar entries, wherein system 100 comprises computer apparatus 101, global rules engine 102, practice management system 106, payor systems 108, and payor policies and rules 107. Computer apparatus 101 comprises machine-readable medium 109, secure network computing environment 110, servers 111, and secure communication links through the public data network (Internet) 103, wherein servers 111, comprise global rules engine 102, practice management system 106, and payor systems 108 (best shown in FIG. 1).

It will be recognized by those skilled in the art that a secure network computing environment 110 may be a LAN, WAN, VPN, cloud, combination thereof or any network configuration of electronic devices. It will further be recognized that global rules engine 102, practice management system 106, and payor systems 108 may function on separate computers (best shown in FIG. 1), or alternatively may function on the same computer (not shown). Similarly, it will further be recognized that payor systems (generally) 108 may function on separate computers (best shown in FIG. 1), or alternatively may function on the same computer (not shown). It will further be recognized that global rules engine 102 and practice management system 106 may comprise a single computer that comprises both the global rules engine 102 and the practice management system 106 stored in non-transient computer readable medium 109 (not shown), or alternatively may function on separate computers (best shown in FIG. 1).

Figure 2:
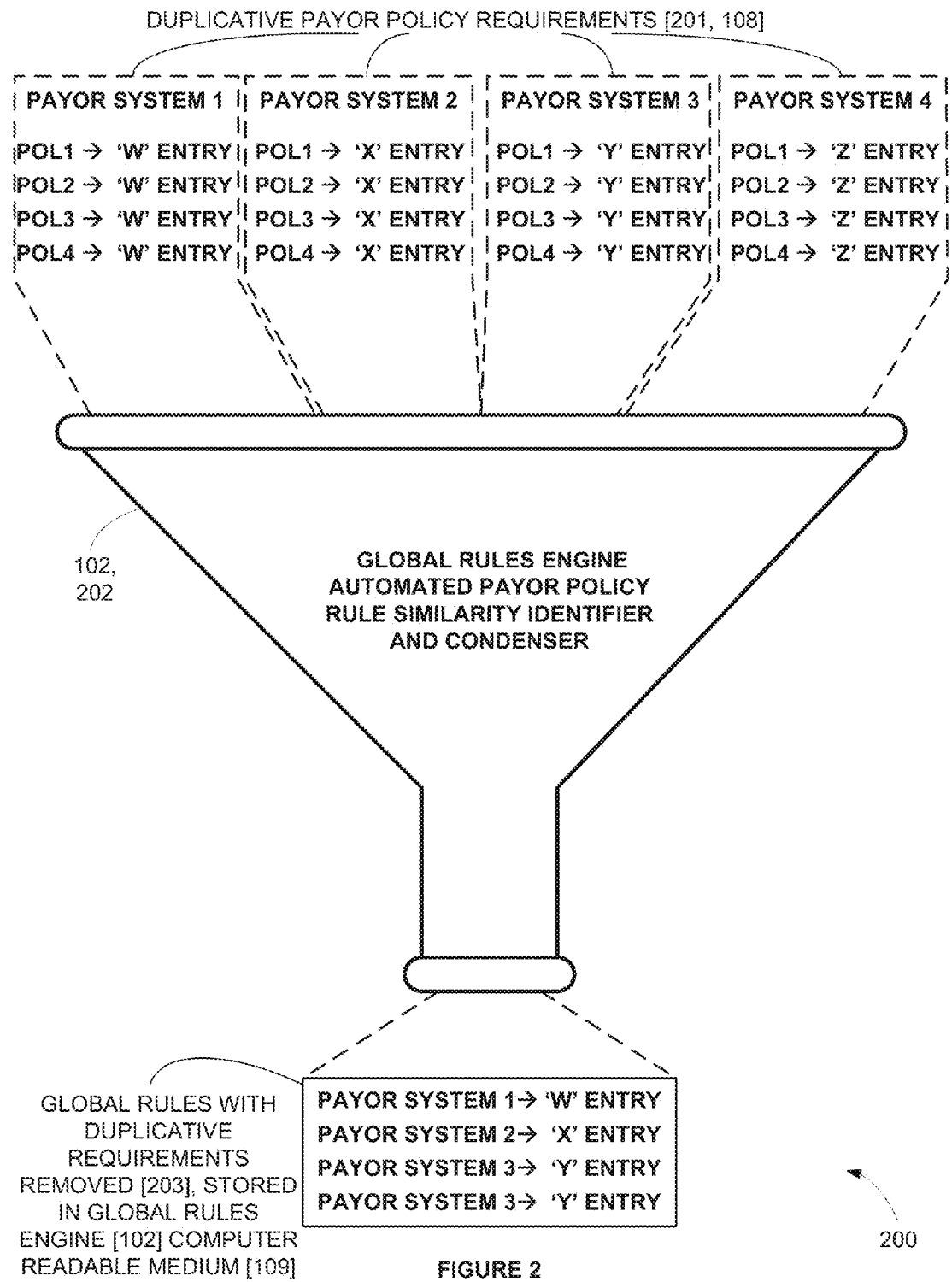
FIG. 2 illustrates high-level use of a global rules engine that automatically identifies and condenses similar entries.

Turning now to FIG. 2, in use, the global rules engine begins its process of identifying duplicate 'requirements' and condensing them in session 200 where initially, the various payor systems 108 possess multiple duplicative policy 'requirements' 107 (medical practice and associated payors are used for non-limiting example purposes only). These duplicative policy 'requirements' 201 are analyzed by the global rules engine 102 at step 202 for identification of duplications that can be removed to enable condensation of 'requirements' 203. The condensation of requirements results in setup efficiencies by eliminating repeated information requests (discussed in more detail shortly), and are then stored in non-transient computer readable medium 109 for application to the setup process.

Figure 3:
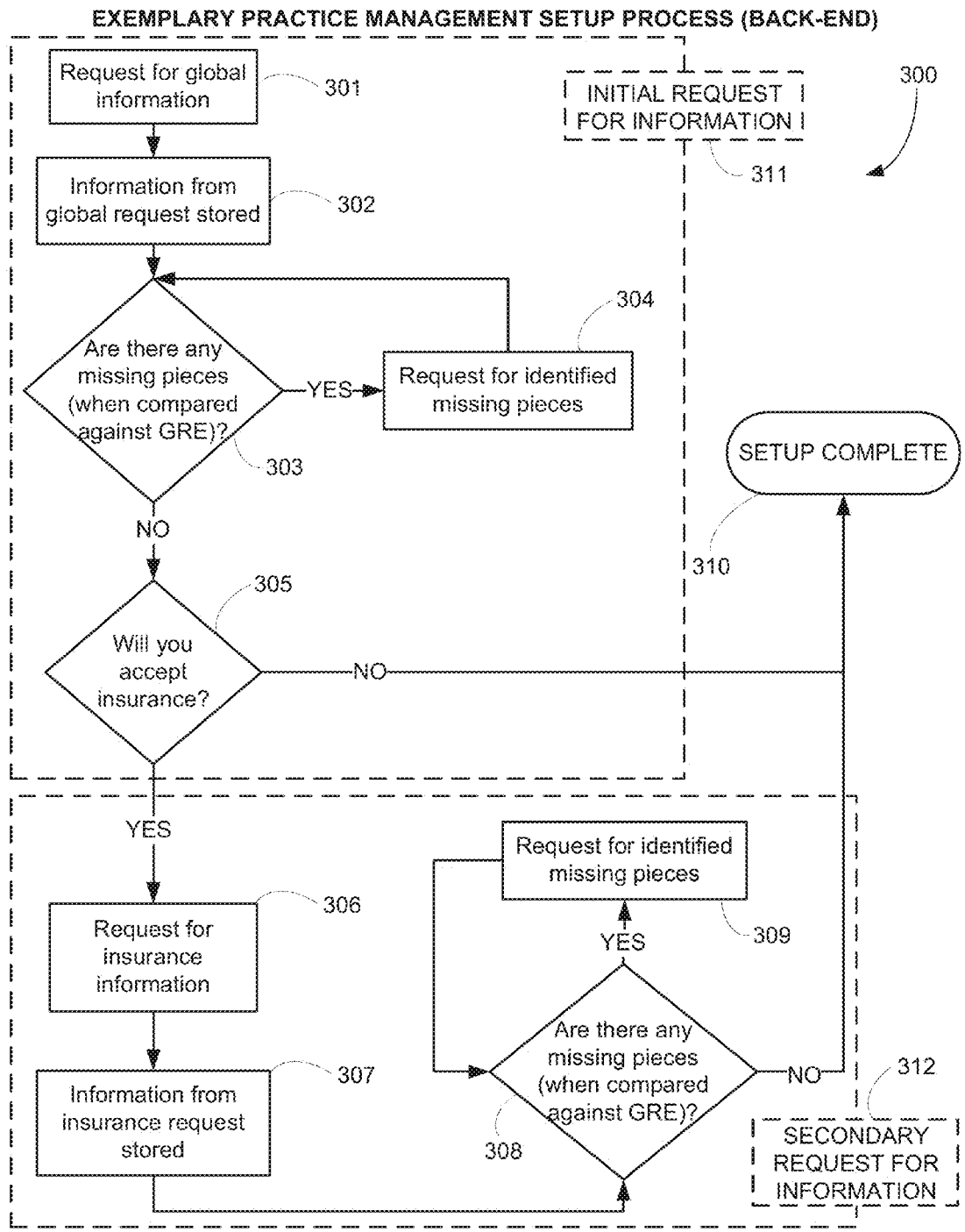
FIG. 3 is a flowchart depicting an exemplary practice management setup process (from the back-end) with a global rules engine included.
Figure 5A:
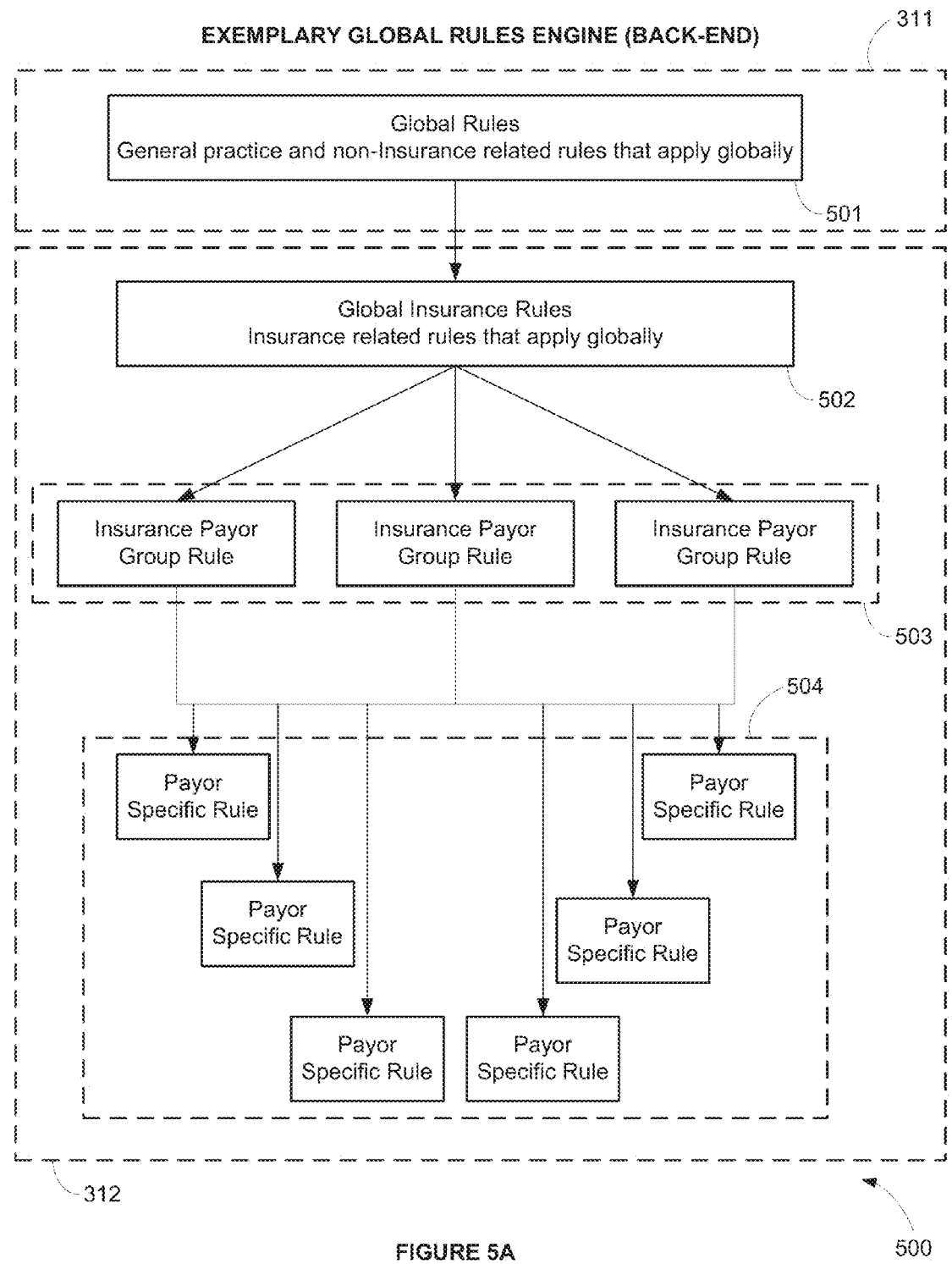
FIG. 5A is a flowchart depicting part of an exemplary practice setup process information gathering flow (from the back-end) with a global rules engine included, according to the embodiment of FIG. 3.

Turning more particularly to FIG. 3 and FIG. 5A, an exemplary practice management setup process is shown by session 300 to highlight setup efficiencies gained by the global rules engine's identification and condensation of duplicate 'requirements.' In the beginning of session 300 is the initial request 311 for information to be stored by the global rules engine 102. Here, at step 301, the first request for globally applicable information occurs. This first request includes general practice and non-insurance related rules that will apply globally for the practice 501. The information acquired from this first request is then stored in non-transient computer readable medium 109 by the global rules engine 102 at step 302. The practice setup process then moves on to additional initial information requests with the assistance of the global rules engine 102 at step 303. Here, the practice setup process determines if any information needed for step 301 is missing. If so, at step 304, the practice setup process sends a request for the identified missing pieces. Once the requisite information has been acquired, according to the practice setup process and verified by the global rules engine 102, the practice setup process then makes the last initial request (whether the practice will accept insurance, at step 305) for information to determine what information will be required next.

At step 312 (jointly referencing FIG. 5A and session 500 at the same time), the practice setup process moves on to a secondary request for information, where the global rules engine 102 assists with determining remaining information needed that relates to payor policy requirements 107 beginning with global insurance rules 502 and continuing to insurance payor group rules 503 then on to payor specific rules 504; the information gathered at this point will also be stored by the global rules engine 102. Step 306 makes this further request for insurance-related information, and step 307 stores the information in the global rules engine 102. Similar to step 303 above, with the assistance of the global rules engine 102, step 308 determines what information for step 306, if any is missing. If there is information missing, at step 309 a request for this information is sent. Once the requisite information has been acquired, according to the practice setup process and verified by the global rules engine 102, the practice setup process is complete 310.

Turning even more particularly to FIG. 7A (with reference to FIG. 5A), an exemplary practice setup process is shown from the front-end (via exemplary screen shots) in session 800. Exemplary screen-shots 801-803 show a request for global rule information that generally relates to the practice and are otherwise non-insurance related rules 501. Exemplary screen-shot 804 shows a request for global rule information that relates to insurance 502. Exemplary screen-shot 805 shows a request for insurance payor group rule information 503 and exemplary screen-shot 806 shows a request for payor specific rule information 504.

Figure 5B:
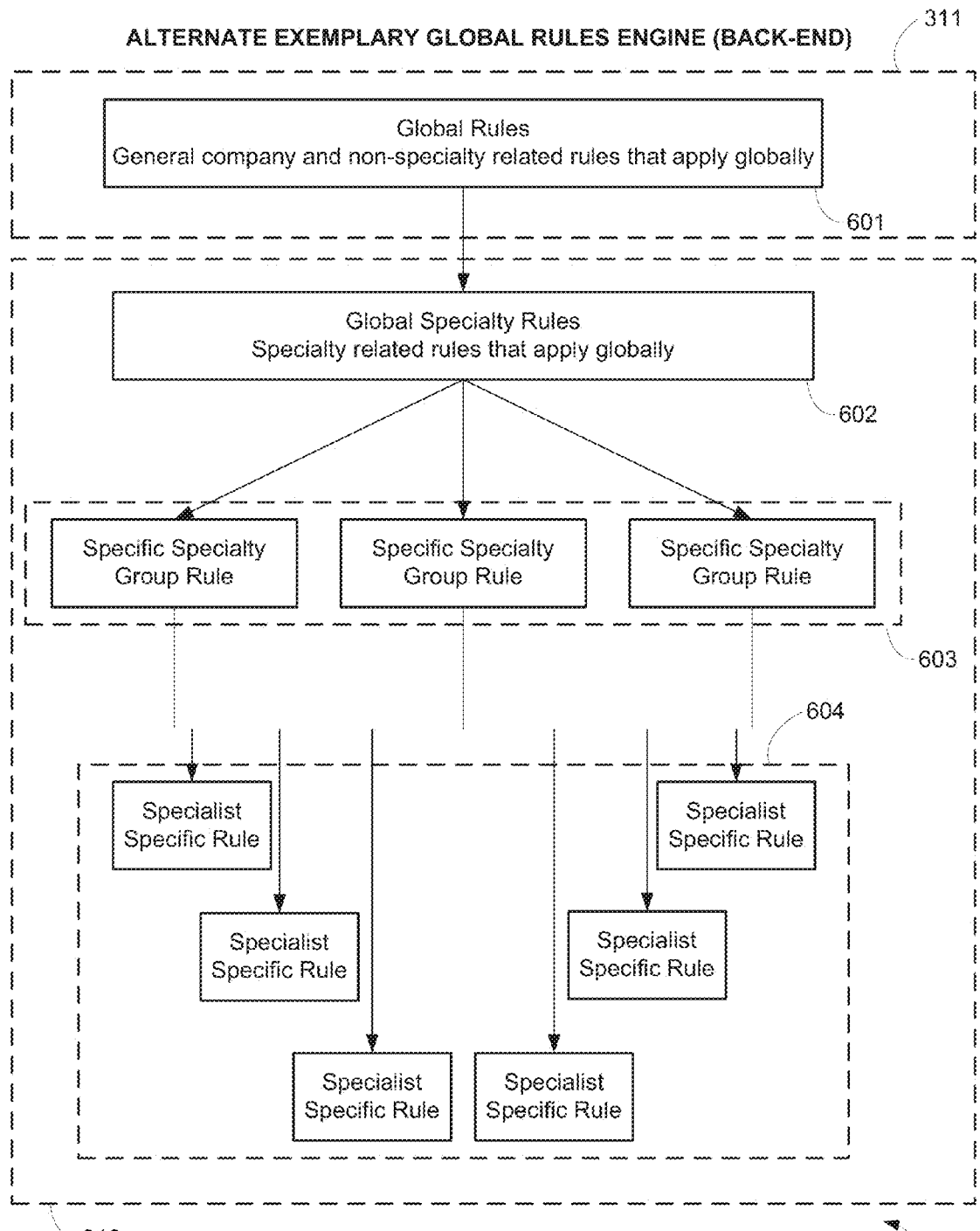
FIG. 5B is a flowchart depicting part of a selected alternate exemplary company setup process information gathering flow (from the back-end) with a global rules engine included.

Similarly, in FIG. 5B, in session 600, the same type of global-to-specific information is being gathered, demonstratively, for an exemplary alternate embodiment. At step 601 the global rules seek to acquire general company and non-specialty related information that will apply globally to the setup process. At step 602, the global specialty rules continue to acquire more specific information related to the specialty of the company being set up. Step 603 acquires specific specialty group rule information and step 604 acquires specialist specific rule information.

Figure 7B:
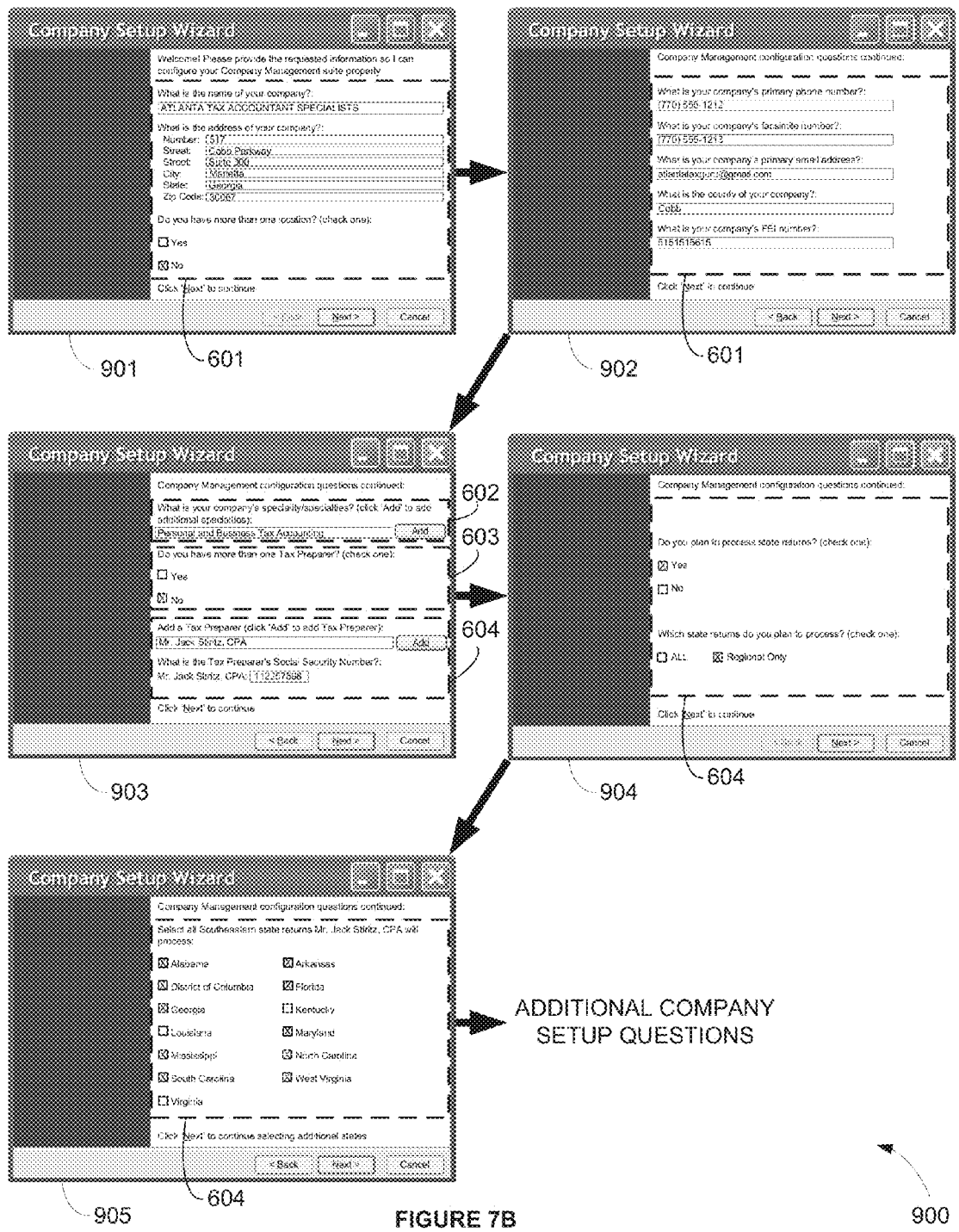
FIG. 7B is a series of screen shot views of a selected alternate exemplary computer apparatus company setup interface depicting an exemplary company setup process information gathering flow (from the front-end) with a global rules engine included, according to the embodiment of FIG. 5B.

FIG. 7B. (with reference to FIG. 5B) in session 900 shows an alternate embodiment exemplary company setup process from the front-end (via exemplary screen shots). Exemplary screen shots 901-902 show a request for global rule information that generally relates to the company and are otherwise non-specialty related rules 601. Exemplary screen-shot 903 shows a request for global rule information that relates to the specialty 602, a request for specialty group rule information 603, and a request for specialist specific rule information 604. Exemplary screen-shots 904-905 demonstrate continued requests for specialist specific rule information 604.

Figure 4:
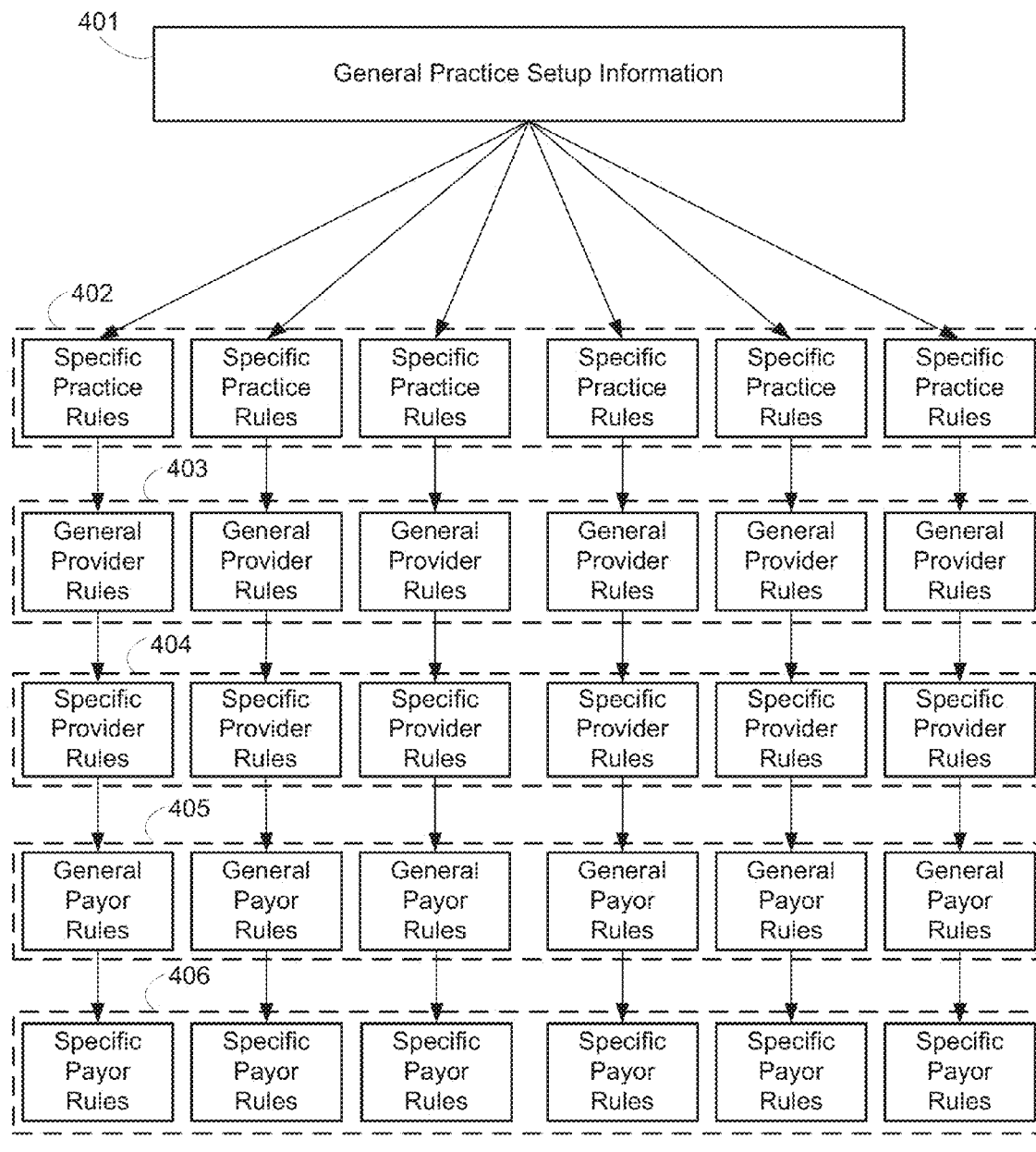
FIG. 4 is a flowchart depicting part of a typical practice setup process information gathering flow (from the back-end) according to the current state of the art.

Turning now to FIG. 4, for the purposes of highlighting the efficiencies gained from use of the present disclosure, session 400 shows a typical practice setup process according to the current state of the art (from the back-end). Step 401, similar to step 501 in FIG. 5A, begins the process by gathering general practice information. Instead of storing this information in non-transient computer-readable medium 109 or otherwise identifying and condensing duplicate payor requirements 201 to produce a more efficient rule set without duplicates 203, the setup process moves on to requesting specific practice rule information 402. 403 is general provider rule information that is then added onto with specific provider rule information 404. 405 is general payor rule information added onto by specific payor rule information 406.

Figure 6A:
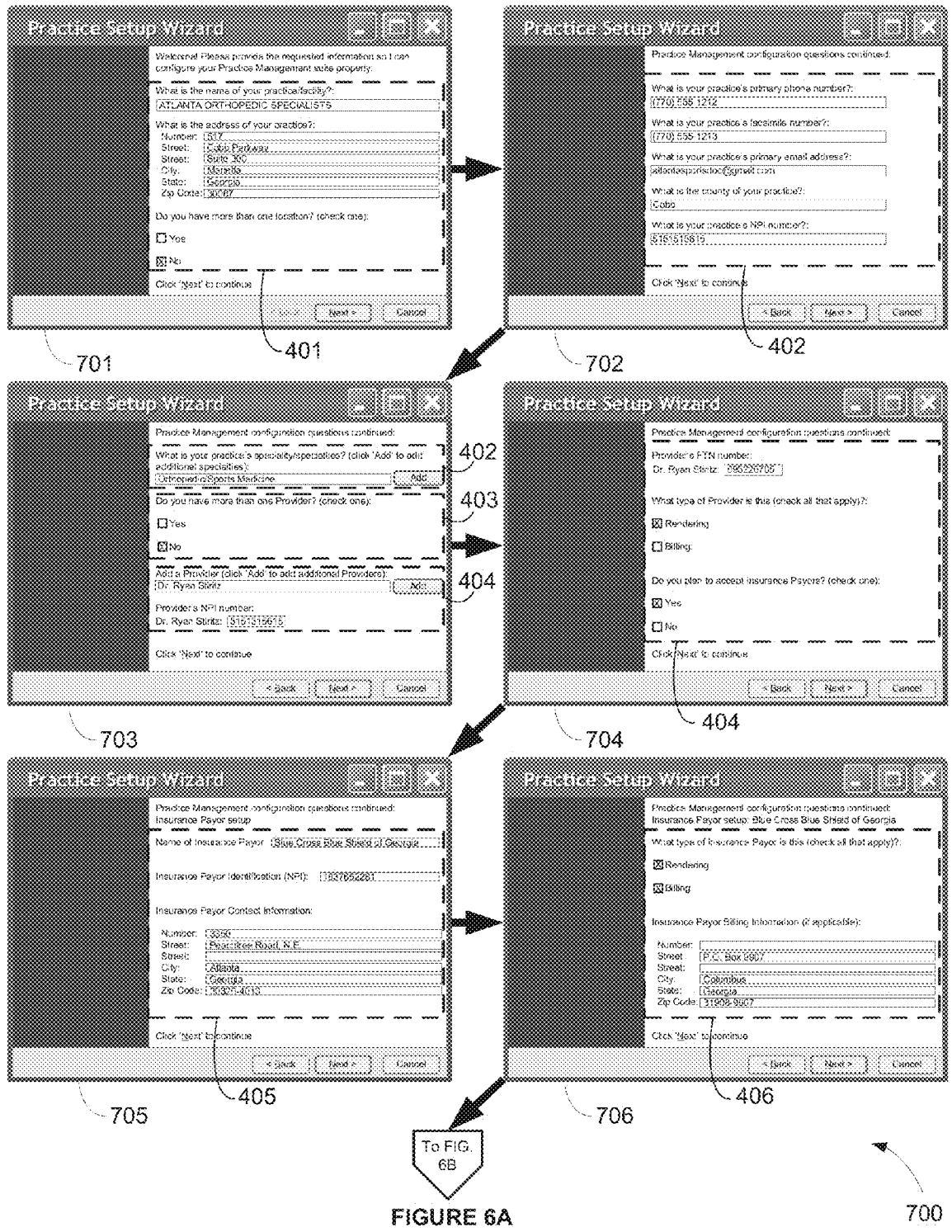
FIG. 6A is a series of screen shot views of a typical computer apparatus practice management setup interface depicting a typical practice setup process information gathering flow (from the front-end) according to the current state of the art, according to the embodiment of FIG. 4.
Figure 6B:
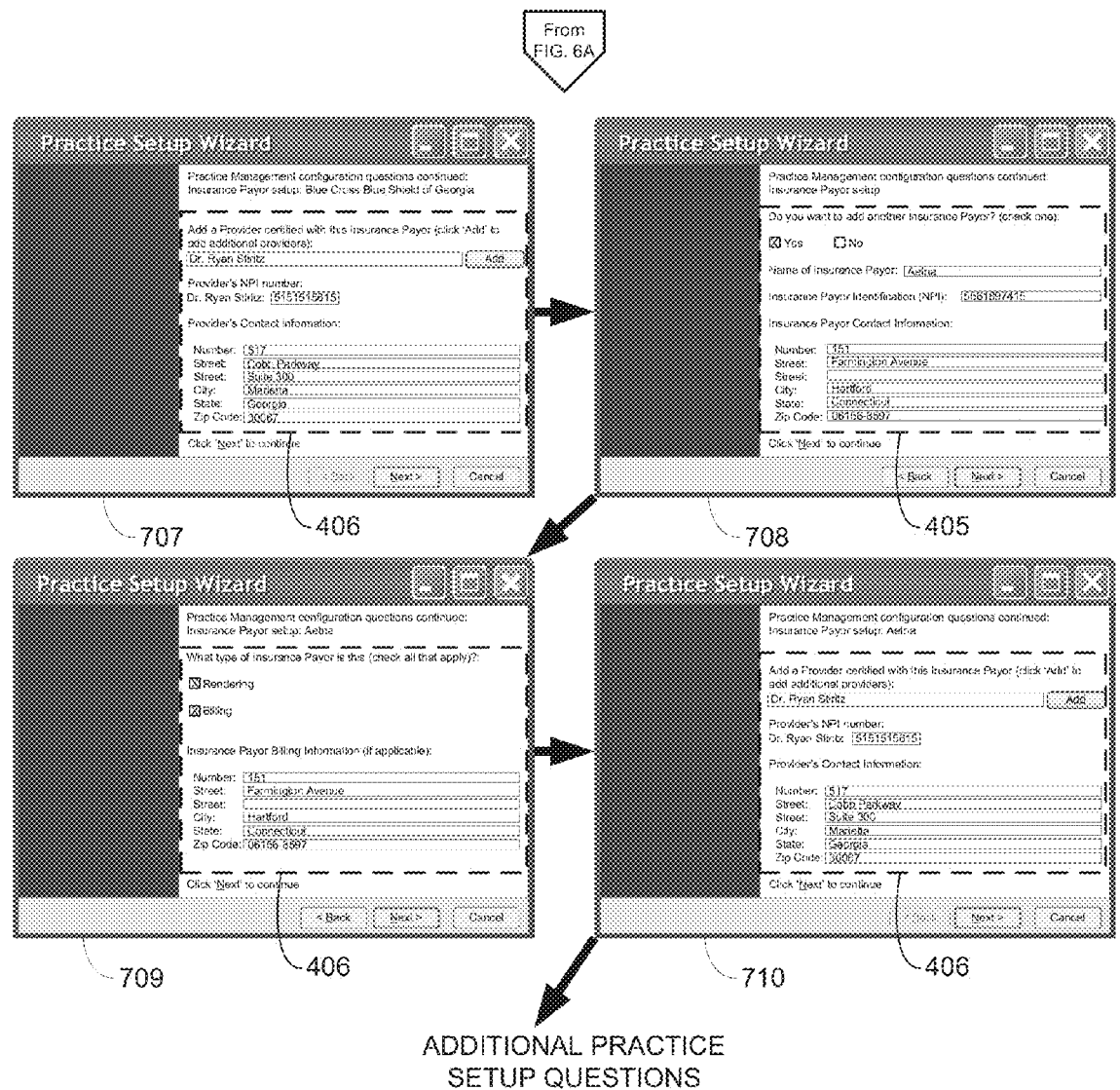
FIG. 6B is a continuation of FIG. 6A, that is a series of screen shot views of a typical computer apparatus practice management setup interface depicting a typical practice setup process information gathering flow (from the front-end) according to the current state of the art, according to the embodiment of FIG. 4.

FIG. 6A (with reference to FIG. 4) shows the aforementioned requests from the front-end in session 700 (via exemplary screen shots) to highlight the inefficiencies. Exemplary screen-shot 701 shows the gathering of the general practice related information 401. Exemplary screen-shot 702 shows the gathering of specific practice rule information 402. Exemplary screen-shot 703 shows the gathering of more specific practice rule information 402, general provider rule information 403, and some specific provider rule information 404. Exemplary screen-shot 704 shows the gathering of more specific provider rule information 404. Exemplary screen shot 705 shows the gathering of general payor rule information 405 and exemplary screen-shot 706 shows the gathering of specific payor rule information 406. To clearly indicate the duplicate requests, FIG. 6B continues with the typical practice setup process according to the state of the art, showing exemplary screen-shot 707 asking for additional specific payor rule information 406 (see FIG. 7A, exemplary screen-shots 805-806 to identify where the global rules engine 102 would make the additional requests unnecessary by already having acquired, accessed, identified duplicates, condensed or otherwise stored this rule information). Likewise, exemplary screen-shots 708-710 highlight the typical setup-process having to repeat itself for each payor, as opposed to globally acquiring, accessing, identifying duplicates, condensing, storing and applying the rule information across all selected payors (best shown in FIG. 7A exemplary screen-shot 806).

The foregoing description and drawings comprise illustrative, exemplary embodiments of the present disclosure. Having thus described exemplary embodiments of the present disclosure, it should be noted by those skilled in the art that the within disclosures are exemplary only, and that various other alternatives, adaptations, and modifications may be made within the scope of the present disclosure. Merely listing or numbering the steps of a method in a certain order does not constitute any limitation on the order of the steps of that method. Likewise, merely listing several alternate embodiments does not constitute any limitation on the other possible embodiments of the present disclosure. Terminologies and specific information sought at certain exemplary steps are not intended to limit the process, but instead show one of multiple possible examples that the typical and exemplary embodiments may resemble.

Many modifications and other embodiments of the disclosure will come to mind to one skilled in the art to which this disclosure pertains having the benefit of the teachings presented in the foregoing descriptions and the associated drawings. Although specific terms may be employed herein, they are used in a generic and descriptive sense only and not for purposes of limitation. Accordingly, the present disclosure is not limited to the specific embodiments illustrated herewith, but is limited only by the following claims.

What is claimed is:

1. A system for identifying and condensing analogous information requests and user responses during setup and maintenance of a healthcare practice management system capable of directly submitting reimbursement claims to a payor comprising a computer apparatus having a processor and an intelligent global rules engine to facilitate interaction with information requests and user responses, the computer system comprising:

a machine-readable medium, wherein data is stored, wherein said data comprises a plurality of information requests and user responses;

a data processing module, wherein said data processing module comprises a lexical analyzer with contextual awareness configured to analyze information requests and user responses to identify and remove redundant or analogous information requests and user responses to generate at least one of a global rule, a rule group, and single rules: and an intelligent and dynamic global rules engine, wherein said intelligent global rules engine comprises said at least one of said global rule, said rule group and said single rules configured to monitor new and existing information requests and user responses to further identify and remove redundant or analogous information requests and said user responses thereby updating said global rule, said rule group and said single rules: and an established data connection to at least one payer whereby reimbursement information related to the medical treatment of at least one individual may be transmitted subsequent to said association of at least one of said rule, said rule group and said single rules with said information requests in relation to said user responses.

2. The system of claim 1, wherein the lexical analyzer in the data processing module uses contextual awareness to analyze the information requests and responses to identify the redundancies or analogies.

3. The system of claim 2, wherein said redundancies and analogies identified by the lexical analyzer are condensed into at least one of said global rule, said rule group and said single rules.

4. The system of claim 3, wherein at least one of said global rule, said rule group and said single rules is then stored in said computer readable medium in said intelligent global rules engine.

5. The system of claim 4, wherein said analogies are condensed into at least one of said global rule, said rule group and said single rules by the lexical analyzer in the data processing module by:

analyzing the analogous information requests and responses.

6. The system of claim 5, wherein said analogous information requests and responses are broken up into elements.

7. The system of claim 6, wherein the elements are further analyzed to identify commonalities.

8. The system of claim 7, wherein contextual awareness is used to condense the identified commonalities into the at least one of said global rule, said rule group and said single rules.

9. A method for identifying and condensing analogous information requests and user responses during setup and maintenance of a healthcare practice management system capable of directly submitting reimbursement claims to a payor via a computer apparatus having an intelligent global rules engine to facilitate interaction with information requests and user responses and connected to at least one payer whereby reimbursement information related to the medical treatment of at least one individual may be transmitted, the method comprising the steps of:

collecting analogous information requests and user responses;

comparing information requests and user responses to identify redundant analogous information requests and user responses;

establishing an intelligent and dynamic global rules engine configured to of dynamically generating rules on-demand via a data processing module by identifying and condensing analogous information requests and user responses in order to generate at least one of a global rule, a rule group, and single rules;

storing said at least one of a global rule, a rule group and single rules on a in machine readable medium;

applying at least one of said global rule, said rule group and said single rules via said intelligent and dynamic global rules engine to recognize duplicate information requests and user responses; and eliminating said redundant or analogous information requests and user responses via said at least one of said global rule, said rule group and said single rules stored in the intelligent and dynamic global rules engine:

transmitting reimbursement information related to the medical treatment of at least one individual to at least one payer via established data connection subsequent to said association of said at least one of said rule, said rule group and said single rules with said information requests in relation to said user responses.

* * * * *